United States Patent [19]

Greene

[11] Patent Number: 4,634,148
[45] Date of Patent: Jan. 6, 1987

[54] NEGOTIABLE INSTRUMENT

[76] Inventor: Edwin B. Greene, 60K Crescent Rd., Greenbelt, Md. 20770

[21] Appl. No.: 552,859

[22] Filed: Nov. 17, 1983

Related U.S. Application Data

[63] Continuation-in-part of Ser. No. 277,015, Jun. 24, 1981, abandoned.

[51] Int. Cl.⁴ ............................................. B42D 15/00
[52] U.S. Cl. ........................................ 283/70; 283/58; 283/901; 283/92; 235/468
[58] Field of Search ................... 235/468; 283/58, 70, 283/74, 89, 90, 901, 62, 57, 59, 1 R

[56] References Cited

U.S. PATENT DOCUMENTS

| | | | |
|---|---|---|---|
| 1,372,397 | 3/1921 | Boschen | 283/58 X |
| 1,567,613 | 12/1925 | Patton | 283/73 X |
| 1,621,457 | 3/1927 | Bullock | 283/73 X |
| 1,622,329 | 3/1927 | MacCordy | 427/7 |
| 2,065,605 | 12/1936 | Moore | 283/94 |
| 3,088,841 | 5/1963 | Guertin | 428/199 |
| 3,092,402 | 6/1963 | Reed | 283/57 |
| 3,108,694 | 10/1963 | Crain et al. | 209/111.5 |
| 3,169,186 | 2/1965 | Howard | 235/468 X |
| 3,282,210 | 11/1966 | Weig | 283/57 X |
| 3,282,720 | 11/1966 | Oleksiw | 283/902 X |
| 3,315,985 | 4/1967 | Hall et al. | 283/57 X |
| 3,426,179 | 2/1969 | Grimm et al. | 235/61.11 |
| 3,477,156 | 11/1969 | Naito | 283/74 X |
| 3,594,933 | 7/1971 | Cooper | 283/89 |
| 3,640,009 | 2/1972 | Komiyama | 283/901 X |
| 3,689,894 | 9/1972 | Laura et al. | 340/172.5 |
| 3,718,908 | 2/1973 | Bloomstein | 340/149 A |
| 3,820,067 | 6/1974 | Shepard | 340/146.3 B |
| 4,017,101 | 4/1977 | Case | 283/57 |
| 4,089,995 | 5/1978 | Ferro et al. | 283/92 X |
| 4,157,784 | 6/1979 | Gröttrup et al. | 283/89 X |

FOREIGN PATENT DOCUMENTS

| | | | |
|---|---|---|---|
| 3187 | 7/1979 | European Pat. Off. | 283/92 |
| 1599011 | 7/1979 | Fed. Rep. of Germany | 283/92 |

OTHER PUBLICATIONS

IBM Technical Disclosure Bulletin, vol., 4 No. 12, May 1962; Lasky, D. J. found in 235/468.

*Primary Examiner*—Paul A. Bell
*Attorney, Agent, or Firm*—John J. Byrne; Bradford E. Kile

[57] ABSTRACT

A negotiable instrument operable for automatic bank scanning and processing wherein the negotiable instrument includes three field areas to receive maker, payee, and amount indicia. A fluorescent ink is applied as background on at least one of the field areas of the negotiable instrument. When ultraviolet light is used to illuminate the negotiable instrument indicia added on top of the fluorescent ink may be automatically detected and scanned.

19 Claims, 5 Drawing Figures

BANK

MR. JOHN DOE
1234 MAIN STREET
ANYTOWN, USA. 00000

STATEMENT OF YOUR ACCOUNT

| ACCOUNT NUMBER | 27396-1726 |
|---|---|
| BALANCE AS OF 03-05-73 | 622.49 |
| ITEMS PAID 20 | 1,093.03 |
| ITEMS DEPOSITED 4 | 1,190.12 |
| SERVICE CHARGE TO DATE | 2.20 |
| BALANCE AS OF 04-05-73 | 717.38 |

| CHECK # | PROCESS DATE | PAY TO THE ORDER OF | AMOUNT | | AMOUNT | REF. # | DATE | − DEBIT + CREDIT | BALANCE |
|---|---|---|---|---|---|---|---|---|---|
| | | | | | | | 03-05 | OPEN BAL | 622.49 |
| 217 | | Piper | $ 32 18/100 | | 32.18 | 071134296 | 03-06 | −30.00 | 592.49 |
| 218 | | W & J Co. | $ 47 53/100 | | 47.53 | 068047724 | 03-07 | −15.50 | 576.99 |
| 219 | | Woodard C Lothrop | $ " " | | " " | " " | " " | " " | " " |
| 220 | | Mrs Mustard | $ " " | | " " | " " | " " | " " | " " |
| 221 | | Liane Rothbot | $ " " | | " " | " " | " " | " " | " " |
| | | | | | | | | | |

FIG. 5

NEGOTIABLE INSTRUMENT

This application is a continuation-in-part, of application Ser. No. 06/277,015, filed June 24, 1981.

BACKGROUND OF THE INVENTION

The present relates generally to a negotiable instrument bank check specially designed for use in a document processing apparatus and more particularly to a proof and coding system including an apparatus for producing an image statement.

In the processing of documents representative of commercial transactions, particularly checks and credit card invoices, it has heretofore been necessary to run the documents through a number of separate and distinct processes in order to classify and sort the documents and glean from them all necessary information. For example, in the case of checks, the checks are first processed through a proof of deposit machine, where the checks are magnetically encoded with all pertinent information. The proof encoder system further utilizes a high speed magnetic character recognition reader and sorter to sort the checks into a variety of categories.

Subsequently, the checks are further sorted into even more categories and the checks written on the bank doing the processing (ON-US checks) are filed in a separate place. While the above process has been relatively accurate it has been quite time consuming.

SUMMARY OF THE INVENTION

In the application for U.S. Letters Patent, Ser. No. 471,758, filed May 20, 1974 and entitled DOCUMENT PROCESSOR, there is disclosed an apparatus for processing documents containing both hand-written and encoded characters and indicative of a commercial transaction. The apparatus includes (1) means for receiving the documents, (2) character recognition means adapted to scan encoded characters that produce recognition signals corresponding to each of the documents and indicative of the encoded characters, (3) scanning means for scanning pre-selected handwritten portions of the documents and developing information signals therefrom, (4) control means responsive to the recognition signals and the information signals to store a particular one of said documents in one of a plurality of pre-selected pockets in response to the information contained in the output signal corresponding to the document and to store the information contained in the recognition signals and the information signals on an output medium. The contents of Ser. No. 471,758 are hereby incorporated by reference.

The present invention relates to a check to be used in the above described apparatus. The check is designed so that the maker's signature appears within a first horizontal band area on the check and the written payee and the written numerical amount appear within a second and third horizontal band area on the check respectively. Aligned with said band areas and positioned between the border and edge of the check are a pair of areas designed to trip the scanning means. Once tripped, the scanner scans the preselected portions of the check, namely the two band areas. The image data obtained via the information signals from the scanner and the recognition data obtained via the recognition signals from the optical reader relative to the ON-US checks only are cycle sorted onto the storage media. At cycle time, the accumulated files are re-entered to a random access device and are sorted by account number sequence and by check sequence number within accounts. The structured files are then merged with a master file and a history file to generate a statement file. A statement generator puts out a statement containing at least the written payee and written numerical amount information which the maker can check against his check stubs. The statement can also include the maker's signature.

OBJECTS OF THE INVENTION

An object of the present invention is the provision of a negotiable instrument for use with an improved apparatus for the processing of documents indicative of a commercial transaction.

Another object of the present invention is provision of a novel method for processing a negotiable instrument and preparing a statement of account.

A specific object of the invention is the provision of a negotiable instrument wherein designated information areas of a negotiable instrument of any size, shape, or color can be facilely machine scanned, read, and processed for payee, amount, and maker information.

It is a further specific object of the invention to provide a negotiable instrument wherein fluorescent ink is used as background in designated information areas to facilitate information scanning and reading.

BRIEF DESCRIPTION OF THE DRAWINGS

Other objects and advantages of the present invention will become apparent from the following detailed description of preferred embodiments taken in conjunction with the accompanying drawings, wherein:

FIG. 5 illustrates an example of a hard copy statement which may be produced by utilizing the subject invention.

DETAILED DESCRIPTION

Figure 1:
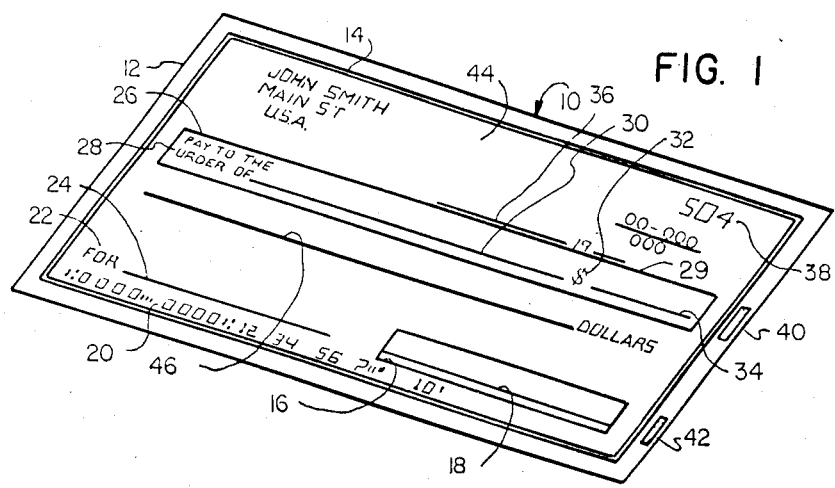
FIG. 1 is an axonometric view of a check document which illustrates the instant invention.

Referring to FIG. 1 there is shown a planar check 10 which incorporates the instant invention. The check has an edge 12 which may be straight or attached to a stub as by perforations (not shown) or the like. A border 14 extends around the check inwardly of the edge, to leave a peripheral space therearound.

A first blank area or field 16 of generally rectangular configuration has within it a "signature" line 18 on which the maker of the check signs his signature.

The usual series of magnetically or optically readable bank and account numbers 20 are found in the lower left hand corner of the check. A "for" notation 22 and line 24 are placed immediately above the numbers 20.

A second blank area or field 26 is located above the first blank area 16 and has a "pay to the order of" notation 28 and accompanying payee line 30. A third blank area or field 29 is located adjacent the dollar sign 32 and includes line 34 in which the maker enters the numerical value of the check and writes the same value on line 46. A date line is provided as at 36 and the check number is at 38. Two marks 40 and 42 are shown located between the right-hand edge of the check and the border 14. The check area 44 outside of blank or noncolored areas 16 and 26 is shaded as with a typical check pattern of a color other than white. I.e., the areas 16 and 26 are white or sufficiently light in relation to the remainder of the check so that any writing stands out in contrast to it.

The dark marks 40 and 42, while preferably black, can be of a color dark enough to be in contrast with the colored or patterned area 44 of the check. I.e., areas 16 and 26 are light, area 44 (the remainder of the check) contrastingly darker to them, and marks 40 and 42 contrastingly darker to them, and marks 40 and 42 contratingly darker to area 44.

Marks 40 and 42 are aligned with areas 16 and 26. Their purpose is to trip a scanner during the processing operation. The checks are placed in an automatic feed (not shown) where they are delivered into a document transport path. They are carried past a character recognition apparatus which is preferably an optical reader. The reader scans the encoded characters such as 20 on the check and produces visual recognition signals corresponding to each of the checks indicative of the encoded characters.

The checks continue on and are processed through a copy means which is an image count microfilmer such as Model 302 manufactured by EOM Corporation. The microfilmer creates a permanent copy of the front and rear of all documents passing through which is put on microfilm.

The checks continue on past a scanning apparatus which is preferably a solid state line camera of the type manufactured by Reticon Corporation, Model LC-600. The scanner is set to scan preselected portions of the check, namely field areas 16 and 26, and develop digital information signals therefrom. The scanner scans field area 26 and "Pay to the order of" line 30 and the numerical value line 34. It also can scan, if desired field, area 16 and signature line 18. A control computer stores the information contained in the recognition signals received from the optical reader and the informaiton signals received from the scanner on an output medium which may be magnetic tape, cassette, or disc. The image data obtained via the recogntion signals from the scanner and the recognition data obtained via the recognition signals from the optical reader relative to ON-US checks only are cycle sorted onto the storage medium. At cycle time, the accumulated files are re-entered to a random access device and are sorted by account number sequence and by check sequence number within accounts. The structured files are then merged with a master file and a history file to generate a statement file. A statement generator receives an output from the existing CPS to create both a microfilm image and a hard copy statement of the account. The statement generator is one of a number of known prior art devices classified as computer output microfilmers and film to paper devices.

Thus, in practice, the operator of the proof encoder system need make no changes in the normal system operating procedures. The document processing apparatus accomplishes the following functions in addition to the prior proofing process when the instant check is employed.

The system captures from all ON-US checks: the account number, the check sequence number, the microfilm index number, the handwritten (or otherwise produced) "Pay to the order of" line, numeric dollar amount fields, the signature, and the tray and sequence numbers.

It is possible to sort out the stop pays, no posts and overdrafts.

Checks other than the ON-US checks may be sorted by whatever criteria the bank chooses.

The use of an automatic feed makes it feasible to run several passes on the ON-US checks.

All rejected items may be immediately re-entered by the operator.

As a result of the above capabilities, the need for high speed MICR reader sorters, the fine sort operation, the filing of ON-US checks and the resultant time delays caused thereby are eliminated.

FIG. 5 illustrates an example of the type of hard copy statement 50 which may be printed by the statement generator 40. The important fields to note are the "Pay to the order of" field 52 and the "Amount" field 54. Since these fields are generated in response to information received from the scanner 38 and, therefore, accurately depict the handwritten portions of the processed checks, it eliminates the need for the bank to gather all file checks and combine them with the proper statements. In the case of other types of commercial transactions, such as credit card invoices, the hard copy statement produced by the statement generator would include a printout of each invoice appearing on the statement, once again eliminating the need for the credit card company to gather filed invoices and combine them with proper statements.

The marks 40 and 42 can be located as shown in FIG. 1 or can be inside the border 14 and can be solid color or shaded with dots or lines. The marks should be contrastingly dark enough to trip the scanner. If this can be done with a non-solid dark area it is sufficient.

Figure 2:
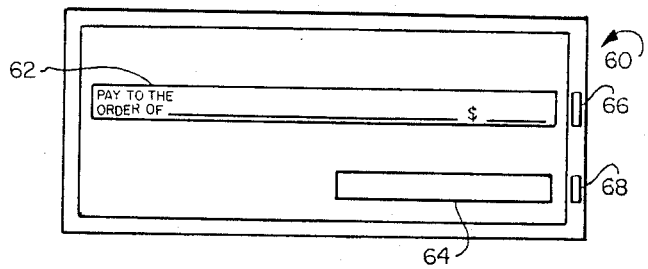
FIG. 2 is an outline of a check document which illustrates another embodiment of the invention.
Figure 3:
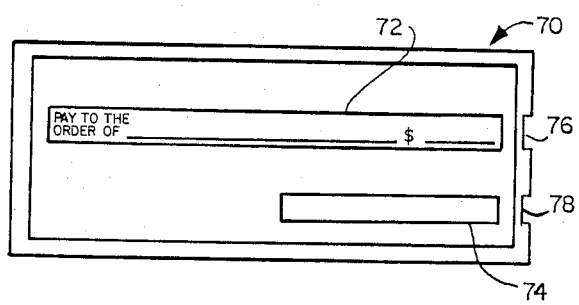
FIG. 3 is an outline of a check document which illustrates a further embodiment of the invention.
Figure 4:
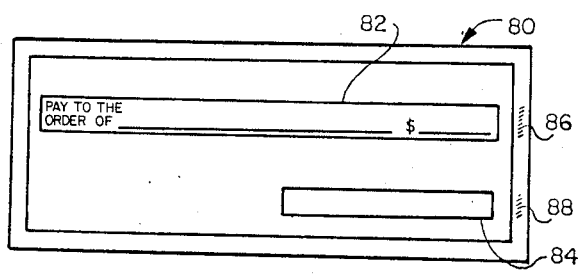
FIG. 4 is an outline of a check document which depicts yet another embodiment of the invention.

Further in the above connection FIGS. 2–4 show other embodiments of the check. FIG. 2 has a check 60 having light areas 62 and 64 which are aligned with cut-out rectangular areas 66 and 68. FIG. 3 shows a check 70 having light areas 72 and 74 aligned with notches 76 and 78. FIG. 4 shows check 80 having light areas 82, 84 aligned with shaded marks 86, 88 respectively.

The embodiments of FIGS. 2 and 3 are designed to trip the scanner in a different fashion from those of FIGS. 1 and 4. The latter are optical trips whereas FIGS. 2 and 3 are physical trips. In all cases, the marks or notches should be aligned with the light areas so as to inform the scanner what to scan.

In addition, the scanning apparatus may be actuated by use of a fluorescent ink as background in the desired areas 16, 26 and 29. In this embodiment of the invention the background may be made to fluoresce by use of an ultraviolet source in the scanning apparatus.

In a preferred embodiment the fluorescent ink has an emission spectrum, when exposed to ultra-violet light, which peaks at about 544 nanometers (yellow to the eye). This fluorescent ink, like all fluorescent inks, is essentially transparent and invisible in a normal light environment and only becomes visible when exposed to ultraviolet light. Such an ink is commercially available under the designation A-716A from Ultra-Violet Products, Inc. of San Gabriel, Calif. A scanner which has been found to be particularly effective for this ink is designated RL512C and is available through EG&G Reticon of Sunnyvale, Calif.

By use of the above, and/or other fluorescent inks which are substantially invisible under conventional lighting conditions, the ink may be applied to the field areas 16, 26, and 29 of a check or negotiable instrument without impairing the underlying pattern or text of the printed check. Upon illumination by ultraviolet light, however, the field areas emit a solid background signal to the scanner and any indicia placed upon such treated field areas will be readily discernible by the scanner because the indicia, in conventional ink, will not create as strong a signal, if any, as the treated background area.

While there have been only several embodiments of the present invention described, it will be obvious to those of ordinary skill in the art that various changes and modifications can be made thereto without departing from the scope of the appended claims.

I claim:

1. A method for processing a negotiable instrument having at least one generally rectangular field area on one side thereof to receive visible indicia by a payor of the negotiable instrument on top of a generally rectangular background field of fluorescent ink said method comprising steps of:
   applying an ultraviolet source of light to said negotiable instrument;
   scanning said negotiable instrument to locate said generally rectangular background field of fluorescent ink;
   reading only the visible indicia highlighted by the fluorescence of said fluorescent ink;
   developing digital information signals representative of only the visible indicia highlighted by the fluorescence of said fluorescent ink within said at least one generally rectangular field area; and
   storing the digital information signals representative of the visible indicia within said at least one generally rectangular area.

2. A method for processing a negotiable instrument as defined in claim 1 and further comprising the step of:
   preparing a statement of account including a reproduction of the indicia within said at least one generally rectangular field area of the negotiable instrument.

3. A negotiable instrument operable for automatic bank scanning and processing comprising:
   a planer member of generally rectangular configuration and having a width and height and bank identification information and an area for receiving a date of making of the negotiable instrument on one side thereof, said planer member further having a first field area on said one side for receiving indicia within said first field area designating a maker of the negotiable instrument, said planer member having a second field area on said one side for receiving indicia within said second field area designating a payee of the negotiable instrument and said planer member having a third field area on said one side for receiving a numeric amount of said negotiable instrument; and
   fluorescent ink means applied as a background upon said negotiable instrument within at least one of said first, second, and third field areas, said fluorescent ink being substantially invisible to the human eye under normal lighting conditions and being operable for receiving visible indicia placed within said at least one of said first, second, and third field areas and upon said fluorescent ink means background, said fluorescent ink means being further operable for selectively permitting a scanner to read the said at least one of said first, second, and third field areas of the negotiable instrument and for optically rendering indicia placed upon the fluorescent ink means background readable by a scanning apparatus directing ultraviolet light onto said negotiable instrument wherein information located within said at least one of said first, second, and third field areas, regardless of location on the negotiable instrument, may be automatically detected and scanned.

4. A negotiable instrument operable for automatic bank scanning and processing as defined in claim 3 wherein:
   said fluorescent ink has an emission spectrum when exposed to ultra violet light which peaks at approximately 544 nanometers.

5. A negotiable instrument operable for automatic bank scanning and processing as defined in claim 3 wherein:
   said fluorescent ink means is applied as a background upon said first field area such that maker indicia placed within said first field may be automatically detected and scanned under ultraviolet light.

6. A negotiable instrument operable for automatic bank scanning and processing as defined in claim 3 wherein:
   said fluorescent ink means is applied as a background upon said second field area such that payee indicia placed within said second field may be automatically detected and scanned under ultraviolet light.

7. A negotiable instrument operable for automatic bank scanning and processing as defined in claim 3 wherein:
   said fluorescent ink means is applied as a background upon said third field area such that a numeric amount indicia placed within said third field may be automatically detected and scanned under ultraviolet light.

8. A negotiable instrument operable for automatic bank scanning and processing as defined in claim 3 wherein:
   said fluorescent ink means is applied as a background upon both of said second and third field areas such that payee and numeric amount indicia placed upon said negotiable instrument may be automatically detected and scanned under ultraviolet light.

9. A negotiable instrument operable for automatic bank scanning and processing comprising:
   a planer member of generally rectangular configuration and having a width and height and bank identification information and an area for receiving a date of making of the negotiable instrument on one side thereof, said planer member further having a first field area on said one side for receiving indicia within said first field area designating a maker of the negotiable instrument, said planer member having a second field area on said one side for receiving indicia within said second field area designating a payee of the negotiable instrument and said planer member having a third area on said one side for receiving a numeric amount of said negotiable instrument; and
   fluorescent ink means applied as a background upon said negotiable instrument within said first, second, and third field areas, said fluorescent ink being substantially invisible to the human eye under normal lighting conditions and being operable for receiving indicia placed within said first, second, and third field areas upon the fluorescent ink means background, said fluorescent ink means being further operable for selectively permitting a scanner to read the said first, second, and third field areas of the negotiable instrument and for optically rendering indicia placed upon the fluorescent ink means background readable by a scanning apparatus directing ultraviolet light onto said negotiable instrument wherein information located within said first, second, and third field areas, regardless of location on the negotiable instrument, may be automatically detected and scanned.

10. A negotiable instrument operable for automatic bank scanning and processing comprising:

a planer member of generally rectangular configuration and having a width and height and bank identification information and an area for receiving a date of making of the negotiable instrument on one side thereof, said planer member further having a first field area on said one side for receiving indicia within said first field area designating a maker of the negotiable instrument, said planer member having a second field area on said one side for receiving indicia within said second field area designating a payee of the negotiable instrument and said planer member having a third area on said one side for receiving a numeric amount of said negotiable instrument; and coating means applied as a background upon said negotiable instrument within at least one of said first, second, and third field areas, said coating means being substantially invisible to the human eye under normal lighting conditions and being operable for receiving indicia visible to the human eye placed within said at least one of said first, second, and third field areas and upon said coating means background, said coating means being further operable for selectively signaling a scanner to read the said at least one of said first, second, and third field areas of the negotiable instrument and for optically rendering normally visible indicia placed upon the coating means background readable by a scanning apparatus directing energy onto said negotiable instrument wherein information located within said at least one of said first, second, and third field areas, regardless of location on the negotiable instrument and negotiable instrument background pattern, may be automatically detected, scanned and machine read.

11. A negotiable instrument operable for automatic bank scanning and processing as defined in claim 10 wherein said energy comprises:
ultraviolet light.

12. A negotiable instrument operable for automatic bank scanning and processing as defined in claim 10 wherein said coating means comprises:
a fluorescent ink.

13. A negotiable instrument operable for automatic bank scanning and processing as defined in claim 12 wherein:
said fluorescent ink has an emission spectrum when exposed to ulstraviolet light which pass at approximately 544 nanometers.
ultraviolet light.

14. A document operable for automatic machine scanning and processing comprising:

a planer member of generally rectangular configuration having a width and height and printed indicia on at least one surface thereof, said one surface, in addition to said print indicia, having a first field area on said at least one surface for receiving variable indicia within said first field area, said planer member having at least a second field area on said one side for receiving variable indicia within said at least a second field area distinguishable from the variable indicia within said first field area; and coating means applied as a background upon said document within at least one of said first, and at least a second field area, said coating means being substantially invisible to the human eye under normal lighting conditions and being operable for receiving indicia visible to the human eye under normal lighting conditions placed within said at least one of said coating means background, said coating means being further operable for selectively keying a scanner to read the said at least one of said first and at least a second, field areas of the document and for optically rendering visible indicia placed upon the coating means background readable by a scanning apparatus directing energy onto said document wherein normally visible information located within said at least one of said first and at least a second field area, regardless of location and print background on the document may be automatically detected, scanned and machine read.

15. A document operable for automatic machine scanning and processing as defined in claim 14 wherein:
said coating means comprises a fluorescent ink.

16. A document operable for automatic machine scanning and processing as defined in claim 14 wherein:
said energy comprises ultraviolet light.

17. A method for processing a document having printed indicia and at least one generally rectangular field area on one side thereof to receive normally visible indicia on top of a coating within said at least one rectangular field which coating is generally invisible to the unaided eye said method comprising steps of:

applying a source of energy to said document including the background coating within the at least one generally rectangular field area and thereby, highlighting the at least one generally rectangular field area;

scanning said document to locate the highlighted generally rectangular coated background field;

reading only the normally visible indicia highlighted by the coating under the influence of the source of energy;

developing digital information signals representative of only the indicia highlighted by the background coating within the said at least one generally rectangular field area; and storing the digital information signals representative of the indicia within said at least one generally rectangular area.

18. A method for processing a document as defined in claim 17 wherein:
said step of applying a source of energy comprising bathing the document with ultraviolet light.

19. A method for processing a document as defined in claim 17 wherein:
said step of reading comprises reading normally visible indicia highlighted by fluorescence of the coating of the at least one generally rectangular field area.

* * * * *